United States Patent [19]
Rosenberg

[11] 3,833,952
[45] Sept. 10, 1974

[54] NONLINEAR ENERGY ABSORPTION SYSTEM

[75] Inventor: Bruce L. Rosenberg, Atlantic City, N.J.

[73] Assignee: The United States of America as represented by the Secretary of the Navy, Washington, D.C.

[22] Filed: Jan. 18, 1973

[21] Appl. No.: 324,614

[52] U.S. Cl............................ 5/353, 5/348 R, 5/355, 244/122 A
[51] Int. Cl........................ A47c 27/04, A47c 27/22
[58] Field of Search .... 5/348 R, 353 WB, 355, 361; 297/452, 456, DIG. 102; 244/122 R, 122 A

[56] References Cited
UNITED STATES PATENTS

| | | | |
|---|---|---|---|
| 2,461,062 | 2/1949 | Kane | 5/353 |
| 2,805,429 | 9/1957 | Woller | 5/353 |
| 3,130,964 | 4/1964 | Johnson | 5/355 |
| 3,214,117 | 10/1965 | James | 244/122 A |
| 3,382,511 | 5/1968 | Brooks | 5/355 |
| 3,401,411 | 9/1968 | Morrison | 5/353 |
| 3,585,356 | 6/1971 | Hall | 5/348 |
| 3,601,923 | 8/1971 | Rosenberg | 46/151 |

Primary Examiner—Casmir A. Nunberg
Attorney, Agent, or Firm—R. S. Sciascia; Henry Hansen

[57] ABSTRACT

A military aircraft ejection seat providing normal cushion comfort under ordinary conditions of use and effectively absorbing the inertial energy of the pilot when the seat ejects and undergoes a square wave acceleration. The seat comprises a plurality of cylindrical shaped cushion-like rate nonlinear support elements between a metal seat pan and the buttocks of a pilot. The cushion-like supports are arranged in a hexagonal pattern and are provided with a helical spring that cushions the pilot in ordinary flight conditions and a flow-dilatant suspension that substantially resists compression only during high rates of compression.

7 Claims, 3 Drawing Figures

PATENTED SEP 10 1974

3,833,952

NONLINEAR ENERGY ABSORPTION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to aircraft ejection seats and more particularly to a seat having nonlinear characteristics to substantially resist compression during square wave acceleration.

Ejection seats on military aircraft normally comprise a comfort cushion made of resilient plastic foam covering the pilot's survival kit which is a relatively dense block. The kit rests on the metal seat pan. On ejection from the aircraft, the seat pan undergoes a square wave acceleration with a plateau of between 15 and 19 G's. Acceleration overshoot occurs due to the fairly high compressibility of the comfort cushion. This causes the seat pan to attain a considerable velocity with respect to the pilot's buttocks. When firm contact does occur, the peak forces applied to the pilot may be in the order of 30 to 38 G's for a period of approximately 20 milliseconds. In other words, the pilot gets a "kick in the pants."

The above presents a problem to provide a pilot with a comfortable seat during normal operation that will not provide detrimental acceleration overshoot during ejection.

SUMMARY OF THE INVENTION

Accordingly, it is a general purpose and object of the present invention to provide an improved acceleration protective device. It is a further object to provide an aircraft ejection seat with a cushion that prevents acceleration overshoot. Another object is to have the cushion provide a first means of support during normal operation and a second means of support during ejection.

This is accomplished according to the present invention by providing a cushion on which the pilot sits that includes support by means of a plurality of helical springs and a flow-dilatant material. The helical springs support and cushion the pilot during normal operation and the flow-dilatant material substantially resists compression only during high rates of compression. This prevents the acceleration overshoot that would occur if only the spring support were present and additionally provides a high degree of comfort that would be absent with only the flow-dilatant suspension present.

DESCRIPTION OF THE PREFERRED EMBODIMENT

The primary sensible characteristics of flow-dilatant mixtures is that they have a very definite characteristic flow rate (CFR). As long as the forcing function rate is below the CFR, the materials flow easily with very little resistance; but for higher CFR's, the apparent viscosity rises rapidly.

Dilatancy is said to be caused by the close packing of suspended particles in a liquid. At higher rates of shear, more of the liquid is trapped in voids between particles and the particles rub against each other because of lack of lubrication. This increases the resistance to flow of the dilatant materials with increasing shear. Therefore, the damping effect of flow-dilatant supensions is strongly dependent on the rate of strain or deformation. At low rates, a dilatant material such as an aqueous-starch suspension behaves like a slightly viscous liquid while at high rates, the behavior is that of a dense solid. In addition, it is possible to change the characteristic flow rate of a given suspension over a fairly wide range by varying the relative proportions of the solid and liquid phase.

Figures 1, 2:
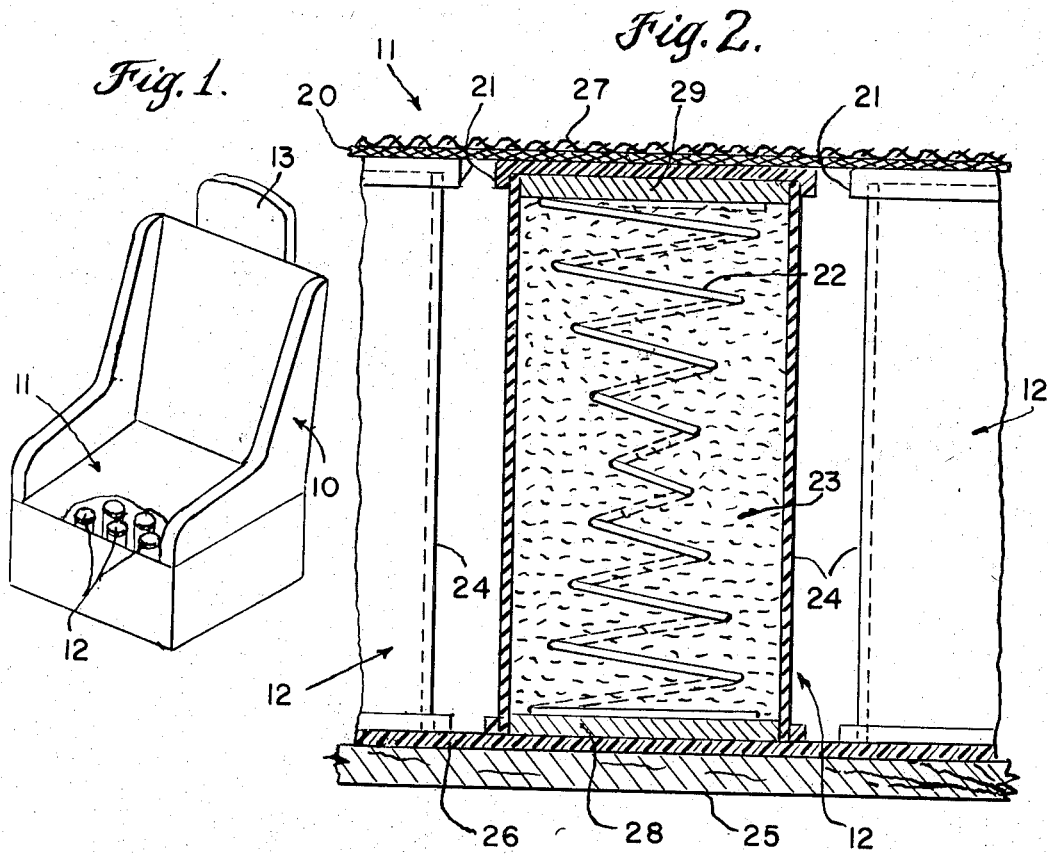
FIG. 1 is an aircraft ejection seat having a comfort cushion with a dilatant suspension according to the present invention.
FIG. 2 shows a sectional view of an elastic container of FIG. 1.

Referring now to FIG. 1, there is shown a seat 10 for use as an aircraft ejection seat. Seat 10 has both a headrest 13 and a comfort cushion 11 rigidly attached and forming part of seat 10. The cushion 11 is comprised of a plurality of elastic containers 12 extending throughout cushion 11. The containers 12 may be regular right cylinders having a diameter of 1½ inches and a height of 3 inches. Larger cross-sectional areas can be used as well as various cross-sectional shaped areas; in fact, a cushion 11 could be built using only one large container 12. However, this would not be totally satisfactory due to a floating sensation.

FIG. 2 shows a partial cross-sectional view of a comfort cushion 11 focusing on one of the plurality of containers 12. The top cover of container 12 can be comprised of a material such as canvas 27 and underneath it an interconnected lacing 20 of nylon or other suitable material. Both canvas 27 and lacing 20 must be pervious to air for reasons to be explained later. Underneath the lacing 20 is a plurality of rigid top plates 21. The plates 21 can be light weight plastic, metal or other suitable material. The plates 21 can be affixed to lacing 20 by tieing or other suitable means if required. Underneath each top plate 21 is a container 12 comprising a helical tapered spring 22 and a flow dilatant material 23. The spring should have a K ~ 10 lbs/inch. The flow dilatant material can be an aqueous-starch suspension made from 45.5 percent saturated salt water solution and 54.5 percent cornstarch, by weight. A suitable CFR for the suspension would be approximately 3 inches/second.

The side wall 24 of container 12 can be made from natural or synthetic elastomers such as stabilized natural latex rubber or synthetic rubber with an elongation of 400– 600 percent, with a wall thickness of from 0.01 to 0.05 inch. This provides sufficient thickness to prevent rupture on maximum compression but not so thick as to contribute substantially to the low frequency stiffness of cushion 11. A pair of plugs 29 and 28 are inserted at opposing ends of the side wall 24. If additional support for affixing the plugs to container 12 other than the elasticity of side wall 24 is required, the plugs 29 and 28 can have grooves on their outer circumference for wiring to be used for additional support. The top of container 12 can be press fitted and/or glued to top plate 21.

The containers 12 are also mounted and glued on a plate 26 having circular ridges and attached to a plate 26. The plate 36 may be made of metal or other suitable material. Underneath and affixed to plate 26 is a base 25. The base 25 may be made of wood and can either extend throughout the cross-sectional area of cushion 11 or merely around the edges. This cushion 11 is then affixed to the seat in a manner well known to those of skill in the art.

Figure 3:
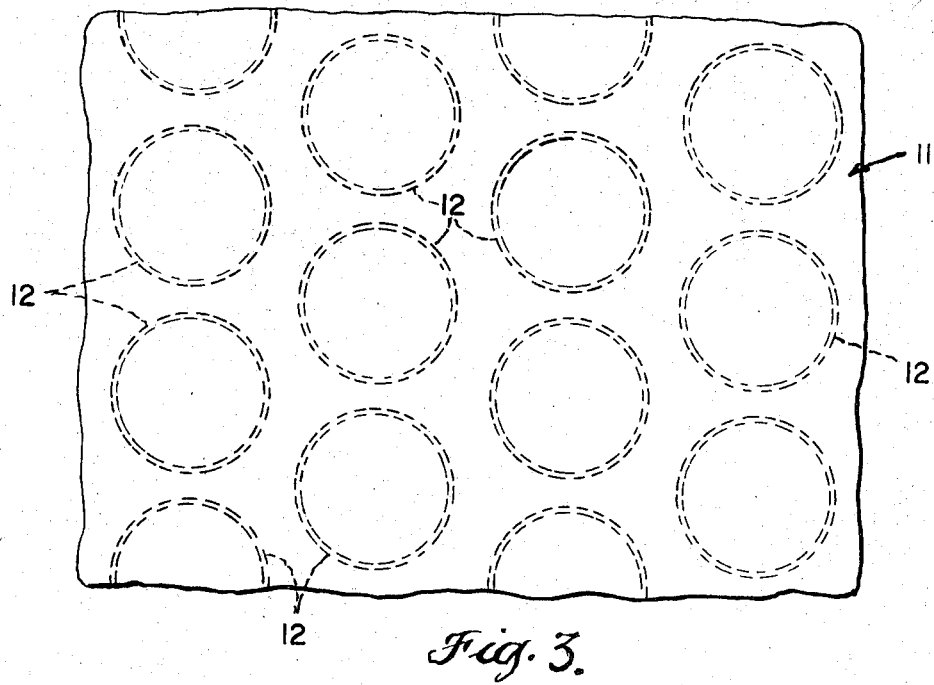
FIG. 3 shows a top view of the hexagonal arrangement of the elastic containers of FIG. 1.

A possible layout of cylindrical containers 12 is shown in FIG. 3. The hexagonal arrangement results in a uniform supporting surface. The distance between the proximal walls of neighboring elements should be sufficient to prevent contact during normal loading of the compartments. For high, steady loads such as 5G maneuvers, the elastic walls 24 will come in contact. This mutual constraint will not occur, however, during the relatively short G load of ejection. A minimum distance of 2½ inches between centers of containers 12 was found to be adequate. Near the edges of cushion 11 where voids are to be found due to the layout arrangement of containers 12, the use of slow return dense polyurethane foam is suitable.

In operation, under normal conditions, spring 22 provides the support for the weight of the pilot with the suspension 12 providing little or no support. However, under a heavy G loading such as ejection, the suspension 12 begins to provide nonlinearly increasing resistance to the compressing forces so that at peak load, most of the support is provided by suspension 12. The air within the cushion prior to compression is forced through the air permeable materials 20 and 27 at the top of the cushion during ejection, thereby releasing forces that would otherwise build up within cushion 11 if the air were trapped.

There has therefore been shown a rate-nonlinear type support having utility as an ejection seat cushion in a military aircraft. Other potential utilities for the device would be that of limit bumpers in automobile suspensions, prosthetic limbs or in any application requiring an element with stable low frequency restoring force (spring 22) in combination with rate-dependent stiffness flow-dilatant suspension 23). Specifically, support devices of this nature can be used for the rate-nonlinear absorption of impact energy, rate-nonlinear transmission of force, and the controlled storage and release of energy.

It will be understood that various changes in the details, materials, steps and arrangements of parts, which have been herein described and illustrated, in order to explain the nature of the invention, may be made by those skilled in the art within the principle and scope of the invention as expressed in the appended claims.

What is claimed is:
1. A suspension system comprising:
 a closed non-porous elastic container;
 spring means placed in said container for providing support under normal loading; and
 a flow-dilatant mixture placed in and filling said container for providing support under shock loading.

2. A suspension system according to claim 1 wherein said spring means comprises a coil spring.

3. A suspension system according to claim 2 wherein:

said flow-dilatant mixture has an approximate characteristic flow rate of 3 inches per second.

4. A suspension system according to claim 3 further comprising:
 a plurality of said containers laterally spaced from each other to constrain lateral expansion at steady above-normal loading.

5. An aircraft ejection seat comfort cushion comprising:
 an air permeable cover;
 a plurality of rigid top plates;
 a plurality of closed non-porous elastic containers arranged adjacent and beneath each of said rigid top plates;
 a plurality of coil springs with at least one coil spring enclosed in each of said plurality of containers;
 a flow-dilatant mixture enclosed in and filling each of said plurality of containers; and
 a base adjacent and underneath said containers.

6. An aircraft ejection seat comfort cushion according to claim 5 wherein each of said containers has the shape of a right circular cylinder.

7. An aircraft ejection seat comfort cushion according to claim 6 wherein:
 said flow-dilatant mixture has an approximate characteristic flow rate of 3 inches per second.

* * * * *